Patented Oct. 21, 1947

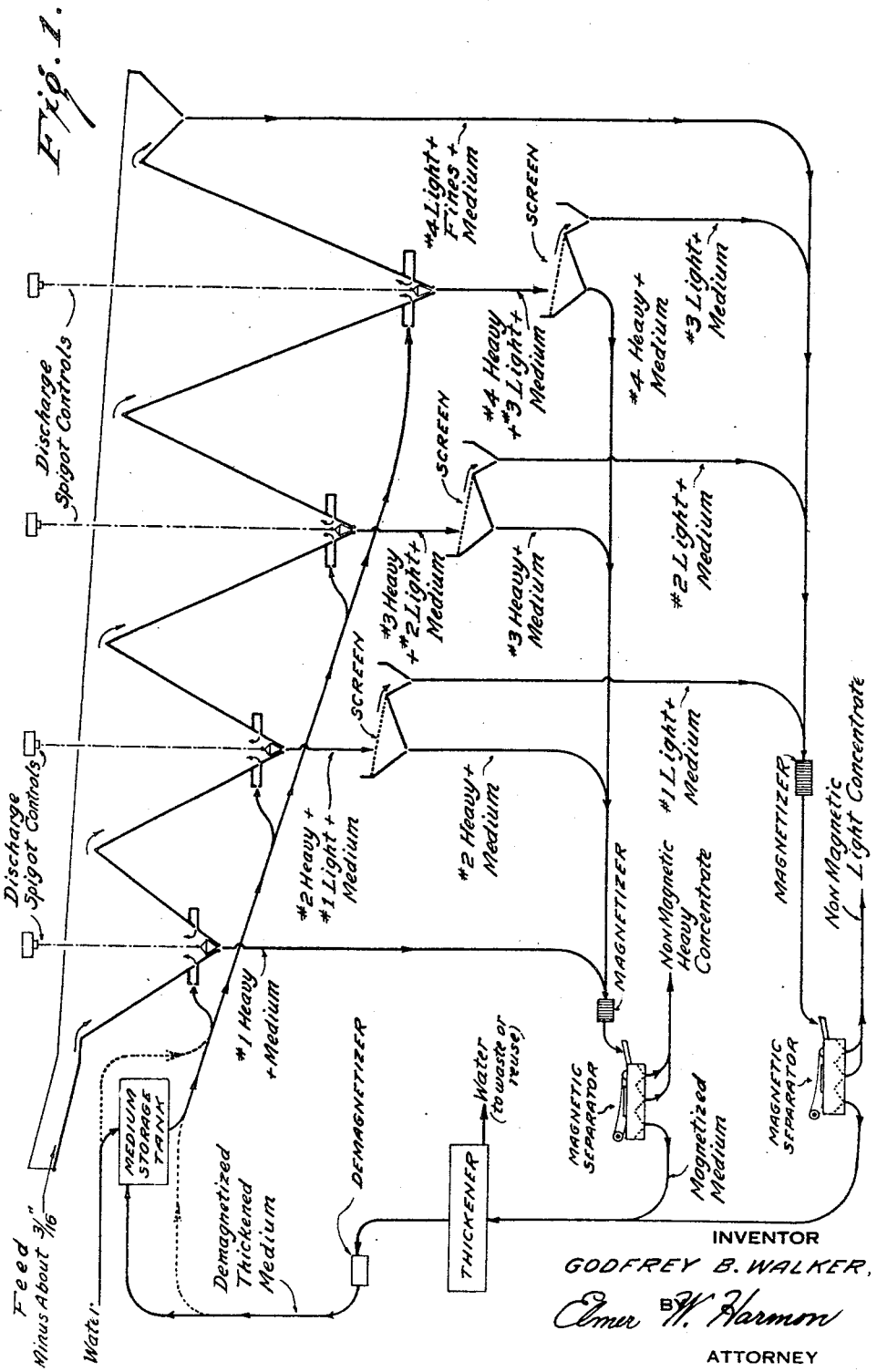

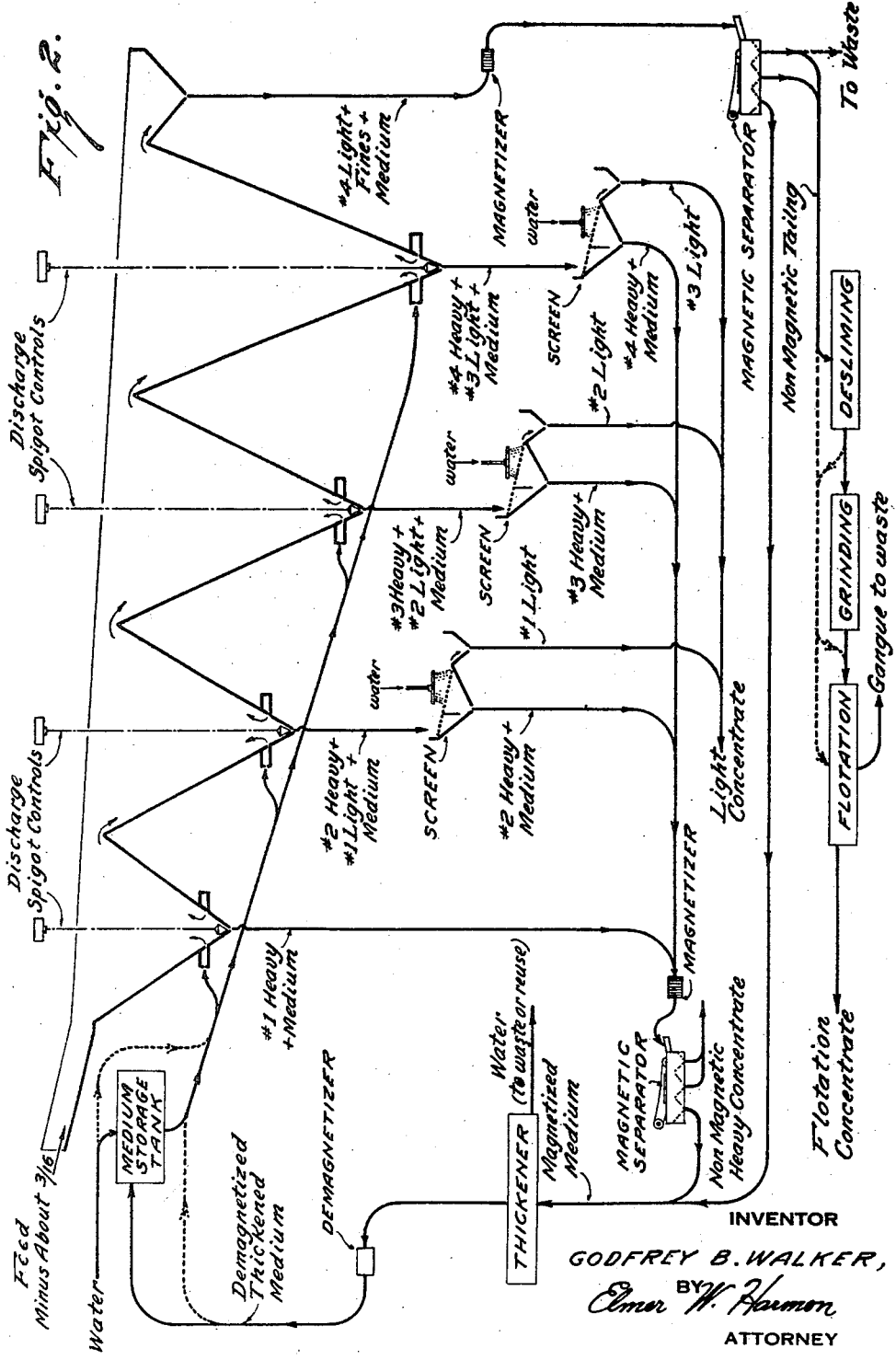

2,429,436

UNITED STATES PATENT OFFICE 2,429,436

COMBINED GRAVITY CLASSIFICATION AND SCREENING OF ORE

Godfrey Buchanan Walker, Old Greenwich, Conn., assignor to American Cyanamid Company, New York, N. Y., a corporation of Maine Application April 21, 1944, Serial No. 532,110

4 Claims. (Cl. 209—17)

This invention relates to the separation of heterogeneous mixtures of relatively small particles and contemplates the provision of an improved process of effecting such separation. More particularly, the invention relates to an improved concentration process whereby two or more solids of different specific gravities, each of which is present as particles of about three-sixteenths of an inch in diameter and/or finer sizes, may be effectively separated.

Considerable interest has been shown in recent years in the so-called "sink-and-float" separation of mixtures of solid particles. This field includes a number of different processes. In perhaps its simplest form, a mixture of particles of two different solids of different specific gravities is immersed in a fluid having a density greater than one solid and less than the other. The mixture is thereby separated into its component parts by the tendency of the heavy materials to sink and the lighter materials to float. Various modifications have been proposed for adapting this separation for use in continuously-operating processes.

In the application of these processes, any liquid having a sufficiently high specific gravity may be employed. However, the most commonly used and only practical liquids comprise suspensions of suitably-sized solids or "medium" in water. A part of the solids is usually colloidal or semi-colloidal in size. Particles in this size range not only remain suspended but also are capable of maintaining the remaining slightly larger-sized particles in more or less permanent suspension. By properly selecting the solids, fluids of substantially any desired density can be prepared. Using fluids of properly selected density, it is perfectly feasible to separate solids which differ in specific gravity by 0.05–0.01 of a point.

Industrially, the continuously-operating modifications of the process are particularly well adapted to large-scale operation. Because they also operate on a relatively low total cost per unit of product, they have been particularly attractive to the mining industry for use in the beneficiation of low grade ores. The use of "heavy-media" separation in this field has become commercially very important. Since the practice in ore beneficiation involves those problems which the present invention is intended to solve, it will be taken as illustrative, although the process is not necessarily so limited.

Despite the obvious advantages of heavy-media separation it also possesses certain limitations. The most serious of these limitations is the fact that from the cost standpoint it becomes less and less efficient as the size of the materials to be separated is decreased. As a result, a fine feed can not be economically handled. Particularly, does this difficulty become noticeable when attempts are made to handle feed having a wide range of particle sizes. Industrially, it is ordinarily desirable to handle a feed coarser than about one-quarter inch.

This inefficiency in handling fine particles is due to a number of different reasons. First of all, the high-density fluid is of necessity carefully prepared. The initial cost of the solid medium may vary from about $20–$125 per ton and even relatively small operations may require as much as a hundred tons in circulation. Of necessity, therefore, the medium must be recovered, cleaned and reused if the operation is to be considered practicable.

In ordinary practice, using galena or the like as the medium, its recovery requires extensive tabling, settling and the like equipment which not only increase the fixed charges, but do not always accomplish satisfactory separation of the medium. Fine materials in the feed obviously still further increase the difficulty in recovering the medium. The loss of medium is relatively high and becomes progressively higher as the amount of fines in the feed increases. Because fixed charges for the original medium can not be increased beyond a certain point by replacement costs without destroying the economic advantage of the process, this is a definite limitation.

This size limitation is industrially important. For example, in a straight sink-and-float operation an ore may be crushed to release the mineral values. The plus one-quarter inch fraction may yield a valuable concentrate when treated by a straight sink-and-float operation, yet the undersize portion which cannot be so handled may contain much useful material if it can be concentrated. Again, many ores are not amenable to straight sink-and-float concentration because they must be crushed to small sizes in order to free the desirable constituents. Still others are so inherently friable that they cannot stand the handling in a sink-and-float operation without breaking down into excessive amounts of small-sized particles. On the other hand, the size reduction obtained or required may not be small enough for froth flotation.

Sink-and-float procedures are less costly than froth flotation and are to be preferred when their use is practical, particularly on ores of low value such as iron ore or phosphate rock. Many attempts have been made to develop processes whereby heavy-media separation can be applied to feed which includes particles of less than one-quarter to three-sixteenths of an inch in size. In the better of these processes, a large pool of medium and ore is maintained in and recycled through the concentrator. Such processes are able to handle smaller feed than can be treated in a straight sink-and-float operation. Even the better of these processes, however, have certain practical and economic limitations. While a good concentration can be obtained, if enough water flow is used and enough ore is recycled, none of these modified processes are as efficient as a straight sink-and-float concentration.

Consequently, there remained a definite need in industry, particularly in the beneficiation of ores, for a suitable process which is not subject to the three-sixteenths to one-quarter inch minimum size limitation. A process is desired which is generally adapted to effectively concentrate a feed containing particles averaging less than one-quarter the inch but still too large for froth flotation. At the same time the process must be one which is not wasteful of the high-density medium used in carrying out the separation.

It is, therefore, the principal object of the present invention to develop a process whereby the advantages of heavy-media separation may be obtained in the treatment of mixtures of small particles. It is also a further object of the invention to provide a process which will be substantially free from a minimum feed size limitation and thereby greatly increase the range of particle sizes over which concentration can be obtained. It is a still further object of the invention to provide such a process which is not subject to practical and economic limitations.

In general, the objects of the present invention are accomplished by subjecting the feed to a series of hydraulic classification operations, using an upward rising current of a medium having a high-density, but slightly less than that of the lighter fractions. In this way, a plurality of portions, each comprising a mixture of progressively finer heavy material and somewhat coarser but progressively smaller light material are produced. Each of these portions is then screened, the screen undersize constituting the fine heavy fraction and the screen oversize constituting the coarser light fraction of the individual portions. The various screen undersizes and oversizes are combined and each combined fraction is subjected to treatment to recover the heavy medium which is in turn thickened and recycled. Preferably, a magnetic medium is used, thus simplifying its separation and recovery.

The invention will be more readily understood when considered in conjunction with the accompanying drawings in which:

Figure 1 shows a flow sheet of one modification of the process, making use of a magnetizable material as the separatory medium; and Figure 2 shows a modification of the flow scheme of Figure 1 in which a different handling of the screen oversize fractions is employed.

As will be seen from the drawings, the feed is first passed to a series of separators, preferably in the form of inverted cones. The number of separating chambers will depend upon the work to be done, the illustrations, for example, having four. Each of these cones is equipped with a spigot having an outlet valve which is manually, mechanically, electrically or automatically controlled. Each of the cones in Figure 1 is provided with a so-called "bustle" for the admission of the separatory medium. However, any other desirable means of introducing the medium, such as a down-pipe through the fluid in the cone may be used. Because of the increasing cross-sectional area of the cone, the separatory fluid will rise at a progressively decreasing velocity.

As the feed enters the first cone it encounters an upward rising current of medium, which in the process diagrammed in Figure 1, is so adjusted as to velocity as to allow the settling of a "sink" concentrate which is essentially comprised of the coarsest of the heavy constituents only. This sink concentrate is removed from the apex of the cone and is designated in the drawings as No. 1 heavy. Overflow, or the "float" fraction from the first separator is fed into a second in which the velocity of the upward rising medium is adjusted to permit the settling of finer heavy materials than are contained in the No. 1 heavy concentrate. Adjustment of the rising velocity may be done in several ways. Preferably, as shown in the drawings, the separatory chambers are of increasingly larger size. The amount of fluid input may be varied by suitable valves.

At this point, the present process begins to take advantage of what in a straight sink-and-float operation is a distinct hindrance, namely, the tendency of small heavy particles to remain suspended in the relatively-viscous medium. This tendency is effected by a number of factors such as the relative densities and areas of the particles and the density and viscosity of the fluid. These factors not only alter the fluid friction and surface tension against the particle but also the area on which they act. The tendency is always present in any sink-float separation but in the case of the larger particles ordinarily handled in a straight sink-and-float operation the average particle is of such size and weight that the effect is negligible. In the smaller sizes, because the area-volume ratio increases more rapidly than the decreasing diameter, the effect of surface tension and fluid friction become relatively more important, producing a pronounced retardation in the falling rate of the smaller heavy particles. Thus, in a fluid of fixed density and viscosity, a small sized particle of only slightly greater density will have a relatively slow rate of fall thus limiting the minimum size of particles which can be effectively separated.

It should be noted at this point that in the present process in which a mixed sink concentrate is produced this is turned to an advantage by selecting the density and viscosity of the separatory fluid on a different basis than in the case of a straight sink-and-float operation. In the latter, the fluid density must be between the specific gravities of the light and heavy materials to be separated, otherwise there can be no concentration. In the present process this is not a limitation. In fact, in making a mixed sink, the gravity of the fluid will never exceed that of the lighter material since in such a case no light particles can fall. The lower density limit is not so markedly fixed. It should be sufficiently less than that of the light materials so that the desired sizes of light materials may be allowed to fall by adjusting the upward velocity of the fluid. It is also possible to control the particle size of both the heavy and light materials which will settle by adding water and thus adjusting both the density and upward velocity of the fluid before it enters the bottom of any one separatory chamber, but such procedure complicates the controls. Such adjustments are preferably made simply by varying the rate at which fluid of fixed density is introduced into each of the separatory chambers.

In the second separatory chamber, therefore, the rising velocity is adjusted so that the sink product comprises somewhat smaller heavy particles, designated as No. 2 heavy, and the largest particles of the light material, designated as No. 1 light. Similarly, the third and fourth separatory chambers, and any additional chambers if more than four are used, are adjusted to produce sink concentrates comprising progressively finer heavy particles, designated in the drawings as No. 3 and No. 4 heavy respectively, accompanied by progressively finer light particles, designated as No. 2 and No. 3 light.

The No. 1 heavy concentrate, being composed principally of heavy material and medium requires no further treatment except separation therefrom of the medium and the water. The Nos. 2, 3 and 4 heavy concentrates, however, are each obtained in conjunction with substantially coarser light material. Each of these is therefore passed over a screen of appropriate size to permit the passage therethrough of the heavy fraction but retain the light fraction. It is in the makeup of the sink products from the different separatory chambers that the process of the present invention obtains one of its most important advantages. By using a high-density medium as the separating fluid it is possible to increase the spread between the average particle size of the light material and the average particle size of the heavy material which settle together in any one chamber. The screening operation by which the small heavy particles are separated from their accompanying larger light particles is thereby greatly simplified. Not only is the choice of screen size made more flexible but a more effective separation of the two types of material on the screen is insured. In some cases it may even be possible to screen the sink product from several chambers on a single screen.

The importance of the effect obtained by using a high density fluid in the separatory chambers may be illustrated for example by substituting various values for L in the equation $$C\sqrt{D(G-L)} = C_1\sqrt{D_1(G_1-L)}$$

in which $C$ and $C_1$ are experimentally determined constants for the particular minerals. $D$ and $D_1$ are the relative diameters of minerals having specific gravities of $G$ and $G_1$ which will settle at the same rate in a fluid having a specific gravity of $L$.

The separation of quartz from galena may be taken as illustrative. The experimentally determined constants $C$ and $C_1$ for quartz and galena are 87 and 100 respectively. Taking $G$ and $G_1$ as 2.65 and 7.5 respectively and assigning unity as the diameter $D_1$ of galena, the relative diameters $D$ of quartz which will settle at the same rate in fluids of various specific gravities $L$ are set forth in the following table.

Table I

| Specific Gravity of Classification Medium | Relative Diameters of Quartz Having Identical Settling Rate With Galena of Unit Diameter |
|---|---|
| 1.0 (water) | 5.08 |
| 1.5 | 6.95 |
| 1.8 | 9.0 |
| 2.0 | 11.4 |
| 2.2 | 16.0 |
| 2.5 | 47.3 |

Therefore, if a mixture of minus ¼ inch galena and minus ¼ inch quartz is to be separated, with first water and then a 2.2 density medium, in the flowscheme of Figure 1; the maximum spread in the relative sizes of the two materials in the sink product from each of the cones will be as shown in the following table. In each case the fluid velocity is adjusted to remove the maximum size range of quartz-free galena in the first chamber and the galena size is about halved in each succeeding chamber. All sizes are in inches.

Table II

|  | Density of Medium 1.0 | | Density of Medium 2.2 | |
|---|---|---|---|---|
|  | Material Size Range | Optional Screen Range | Material Size Range | Optional Screen Range |
| Chamber #1 | Galena—0.25 +0.05 | | Galena—0.25 +0.015 | |
| Chamber #2 | Galena—0.05 +0.025 | 0.05–0.125 | Galena—0.015 +0.0075 | 0.015–0.12 |
|  | Quartz—0.25 +0.125 | | Quartz—0.25 +0.113 | |
| Chamber #3 | Galena—0.025 +0.013 | 0.025–0.063 | Galena—0.007 +0.0035 | 0.007–0.056 |
|  | Quartz—0.125 +0.063 | | Quartz—0.113 +0.056 | |
| Chamber #4 | Galena—0.013 +0.006 | 0.013–0.032 | Galena—0.0035 +0.0018 | 0.0035–0.024 |
|  | Quartz—0.063 +0.032 | | Quartz—0.048 +0.0288 | |

Therefore using a fluid density of 2.2 not only permits production in the same size apparatus of concentrates which in the last chamber includes galena particles only a fraction as large as the finest galena obtained using water, but the screening range is much greater. Using water as a medium the finest quartz in each mixture is only about 2.5 times the diameter of the largest galena, whereas with the high density medium this ratio is 8 to 1.

Figures in Table II are those for pure quartz and pure galena. Actually, such a case seldom occurs in practice. Naturally-occurring ores contain the mineral values and the gangue in admixture. Crushing the ore usually does not produce a mixture of particles each of which is either pure mineral value or pure gangue. The problem more commonly found is to separate one group of particles in which the major portion is mineral value with some gangue from a group of particles which are largely gangue. Therefore neither group will have the gravity of either mineral or gangue but both will have intermediate gravities and therefore $G$ and $G_1$ in the formula above will be much closer. In such cases, using water as a medium the screening size differential will be sharply reduced, in many cases being so small as to be impossible. On the other hand, a similar reduction of the 1:8 ratio using the 2.2 medium still leaves a practical screening ratio.

Choice of the fluid density to be used, while dependent on a number of factors, is largely governed by the average specific gravities of the particles to be separated. While it must be lower than that of the lighter material so that the latter may sink, in order to make the band size spread as large as possible the fluid density should be as high as possible and still have a falling rate which will permit the apparatus to be operated at a practical rate.

It should also be noted that there is a relationship between fluid density and the fluid velocity. Once the density has been fixed, control of the falling rate and of the particle size which will settle in any one chamber is obtained by altering the rate at which medium is introduced into the chamber. This in turn alters the rising velocity and hence the amount of solids in teeter. This latter is a factor of equal or more importance than the density in determining the falling rate. In the chamber, the falling rate is not that of the solid in medium alone but that of the solid in the medium in which particles to be separated are in a state of suspension. The higher the density of the fluid the lower the velocity which will keep the requisite amount of solids in teeter to produce the desired particle size in the sink product.

As shown in Figure 1, the screens are simple vibratory screens in which the underflow plus medium and the overflow plus medium is collected separately. The underflow portions are combined with the No. 1 heavy concentrate and sent to a medium recovery device. In the illustration, the first separator has been set to produce a concentrate of heavy material only. The process is not necessarily so limited. If desired, a mixed sink concentrate may be taken from each chamber. This procedure does not operate at the optimum capacity of the apparatus and may require an additional screen. Therefore it should be avoided whenever possible to do so.

As pointed out above, in the preferred embodiment of the invention the medium is a magnetic material. Using such material, it is readily possible to make up medium of any desired density up to and including densities of about 3.3–3.4. This range is adequate for most practical purposes and has the very decided advantage that it is readily possible to utilize the magnetic susceptibility of the material to simplify its separation from the remainder of the solids. As shown in Figure 1, the medium is recovered from each fraction by passing the light and heavy materials separately through magnetic separators. These magnetic separators may be any one of a number of standard types that are commercially available. Use of a magnetic separator on the combined sink fraction from the first separator and the screen undersizes in a flow scheme such as that of Figure 1 produces a non-magnetic heavy concentrate and a mixture of medium and water.

As shown in Figure 1, the overflow from the last separatory chamber, comprising principally fine light material, medium and usually some slimes, is mixed with the combined screen oversize fractions. This in turn is subjected to a separate medium recovery device. In the illustration, this is again a magnetic separator. It will be seen, therefore, the process produces a non-magnetic, heavy concentrate; a non-magnetic, light concentrate and two mixtures of medium and water.

Although the two medium suspensions may be handled separately, it is more convenient to combine them and pass the mixture through a thickening device. Again as in the case of the magnetic separator, the thickener or densifier may be any one of several commercially available devices. Where a magnetic medium is used, the medium coming from the magnetic separator is magnetized. While the medium will be magnetized by the separator in any case, it is often helpful in securing good recovery to magnetize the medium prior to the separation, as shown in the drawings. The magnetized medium is preferably thickened before being demagnetized, as in the magnetized condition it has an inherent tendency to clot into larger aggregates, thus simplifying the problem of removing the water. Water recovered from the thickener may be sent to waste or may be reused as desired.

The thickened medium is then demagnetized by being passed through a suitable coil or other demagnetizer. This is important since the same tendency to clot which simplifies thickening destroys its utility as a medium in the separatory operations. Demagnetized, thickened medium is then ordinarily sent to a medium storage tank in which it can be diluted with water to the proper density and viscosity to be fed to the separatory chambers. However, if so desired the storage tank may be by-passed and the thickened medium diluted to the proper consistency directly as it is introduced into the medium distributing device of the separator.

In the illustrated process of Figure 1, no washing is done on the screens. However, since in many cases there is a tendency for the finer heavy material to be quite strongly adherent to the coarser light material, washing may be required to insure substantially complete removal of the screen undersize from each sink fraction. In that case, the medium, which in any case is much finer than the fine heavy material, will also be washed through the screen and only the heavy concentrates will have medium admixed therewith. A medium separatory device such as the magnetic separators of Figure 1 will not be required for the screen oversizes. Either separately or combined, they may be directly passed to any suitable dewatering device if the recovery is desired or passed to waste in those cases in which they constitute an undesirable fraction. This procedure is diagrammatically illustrated, for example, in Figure 2.

However, overflow from the final separatory chamber which carries the No. 4 light concentrate and slimes also contains medium and in most cases some of the heavy material. Where the heavy material therein constitutes the preferred fraction, it may be desirable to further process these fines, as by froth flotation, tabling, etc., to recover it. In any case, if a magnetic medium is used, it must be recovered as by passing the material through a small magnetic separator provided for the purpose and mixing the recovered medium with that recovered from the heavy concentrates. The non-magnetic portion may then be subjected to any suitable operations such as desliming, grinding if necessary, and froth flotation. This arrangement is also diagrammatically illustrated in Figure 2.

While the previous discussion has been concerned largely with the use of magnetic materials as the high density medium, the invention is not necessarily limited thereto. Under some conditions other media may be more readily available, perhaps more economical, and for very high densities may be more useful. In such cases the medium may be recovered by gravity concentration, decantation or flotation. However, use of magnetic medium, as discussed above, has decided advantages in that it makes a satisfactory separation and recovery of the medium much simpler.

While the discussion has not mentioned the use of sweeps in the separatory chambers to prevent accumulation of solids on the walls of the cone, they obviously may be used if so desired. Their construction is conventional and forms no part of the present invention. However, care must be taken in their operation to produce the minimum of agitation since too violent disturbance of the fluid flow conditions will prevent satisfactory operation of the augmented classification which is essential to optimum performance.

I claim:

1. A process of separating particles of one specific gravity from a mixture of particulate materials, which includes at least one other material of differing specific gravity, which comprises the steps of establishing a substantially fixed volume of a separatory fluid, said fluid comprising an aqueous suspension of a sufficient amount of solid fines, smaller in size than the particles to be separated, to produce an apparent fluid density greater than one but smaller than the specific gravity of the least dense of the particles to be separated; introducing additional amount of the same separatory fluid at a low level in said volume, in amounts sufficient to produce a steady upward-rising current in and an overflow from said volume; immersing a feed of particles mixture to be separated in said volume; adjusting said upward-rising current of separatory fluid at such velocity as to maintain a substantially fixed amount of solid material in teeter in said volume, to permit settling therethrough of only those particles of the more dense material greater than a predetermined size and any particles of less dense material of sufficiently larger size to settle at approximately the same rate, and to overflow the remaining particles; subjecting the overflow to at least one additional similar operation in which for the fluid density used the upward-rising velocity is adjusted to permit settling of a smaller size range of particles of the more dense material together with those larger but less dense particles which settle at approximately the same rate; passing the settled material from each separation over a screen, adapted to pass the largest more dense particles but retain the smallest less dense particles in the settled material, whereby heavy fractions containing substantially none of the less dense material and light fractions containing substantially none of the more dense material are produced; collecting the heavy and light fractions from each screening operation; subjecting the screen undersize fractions, and separately therefrom at least the overflow from the last immersion step, to a separation whereby the solid fines used in the separatory fluid are recovered, thickening the recovered suspension of medium and recycling the thickened suspension.

2. A process according to claim 1 characterized in that in the first separation the upward-rising current is so adjusted, for the density of the separatory fluid used, as to settle only those particles of more dense material of sufficient size to settle substantially free from less dense material.

3. A process of separating particles of one specific gravity from a mixture of particulate materials, which includes at least one other material of differing specific gravity, which comprises the steps of establishing a substantially fixed volume of a separatory fluid, said fluid comprising an aqueous suspension of a sufficient amount of solid magnetizable fines, smaller in size than the particles to be separated, to produce an apparent fluid density greater than one but smaller than the specific gravity of the least dense of the particles to be separated; introducing additional amount of the same separatory fluid at a low level in said volume, in amounts sufficient to produce a steady upward-rising current in and an overflow from said volume; immersing a feed of particles mixture to be separated in said volume; adjusting said upward-rising current of separatory fluid at such velocity as to maintain a substantially fixed amount of solid material in teeter in said volume, to permit settling therethrough of only those particles of the more dense material greater than a predetermined size and any particles of less dense material of sufficiently larger size to settle at approximately the same rate and to overflow the remaining particles; subjecting the overflow to at least one additional similar operation in which for the fluid density used the upward-rising velocity is adjusted to permit settling of a smaller size range of particles of the more dense material together with those larger but less dense particles which settle at approximately the same rate; passing the settled material from each separation over a screen adapted to pass the largest more dense particles but retain the smallest less dense particles in the settled material, whereby a plurality of heavy fractions containing substantially none of the less dense material and at least one light fraction containing substantially none of the more dense material are produced; collecting the heavy and light fractions from said screening operation; subjecting at least the screen undersize fractions and separately therefrom at least the overflow from the last immersion step, to a magnetic separation whereby the solid magnetizable fines are recovered; thickening the recovered magnetizable fines; demagnetizing the thickened, magnetizable fines; and recycling the demagnetized fines.

4. A process according to claim 3 in which in the first separation the density of the separatory fluid and the upward-rising current are adjusted to settle only those particles of most dense material of sufficient size to settle substantially free from less dense material there being at least two subsequent separatory operations.

GODFREY BUCHANAN WALKER.

REFERENCES CITED

The following references are of record in the file of this patent:

UNITED STATES PATENTS

| Number | Name | Date |
| --- | --- | --- |
| 2,206,980 | Wade | July 9, 1940 |
| 1,392,401 | Chance | Oct. 4, 1921 |
| 2,203,601 | Rakowsky | June 4, 1940 |
| 1,685,521 | Chance | Sept. 25, 1928 |
| 1,559,937 | Chance | Nov. 3, 1925 |
| 2,360,129 | Hebbard | Oct. 10, 1944 |
| 2,151,175 | Wuensch | Mar. 21, 1939 |
| 1,451,067 | Elder | Apr. 10, 1923 |
| 2,191,805 | Pearson | Feb. 27, 1940 |

OTHER REFERENCES

Bureau of Mines Report of Investigations No. 2618 of June 1924, pages 1, 2, 2a, 3, 4, 5 and 6.